United States Patent
DiNoia et al.

[15] 3,678,750
[45] July 25, 1972

[54] LIQUID LEVEL INDICATOR SYSTEM

[72] Inventors: Emanuel J. DiNoia, Briar Cliff Manor, N.Y.; Theodore R. Breunich, Stamford, Conn.

[73] Assignee: Universal Oil Products Company, Des Plaines, Ill.

[22] Filed: Aug. 13, 1970

[21] Appl. No.: 63,348

[52] U.S. Cl. ........................... 73/313, 73/DIG. 5, 200/84 C
[51] Int. Cl. ............................................... G01f 23/12
[58] Field of Search .................. 73/313, DIG. 5; 33/126.7 R; 200/84 C

[56] References Cited

UNITED STATES PATENTS

| | | | |
|---|---|---|---|
| 3,200,645 | 8/1965 | Levins | 73/313 |
| 1,617,287 | 2/1927 | Huggins | 73/290 DIG. 5 |
| 2,927,176 | 3/1960 | Auld, Jr. et al. | 73/290 |
| 2,764,294 | 9/1956 | Johnson | 33/126.7 R |
| 2,411,712 | 11/1946 | De Giers | 73/313 |
| 3,408,053 | 10/1968 | Vantroba | 73/313 X |
| 3,293,579 | 12/1966 | Harper | 200/84 C X |
| 2,771,774 | 11/1956 | Fornasieri | 73/313 |

Primary Examiner—Louis R. Prince
Assistant Examiner—Daniel M. Yasich
Attorney—James R. Hoatson, Jr. and Philip T. Liggett

[57] ABSTRACT

A liquid level indicator system in which a liquid in a tank raises or lowers a float containing angularly positioned magnetic elements according to the level of the liquid present in the tank. The float is co-axially positioned about a vertical tube containing a plurality of reed switches longitudinally aligned and connected in parallel. The magnetic element of the float closes the reed switches at or near the level at which the float is located, thereby short circuiting resistances in an electrical circuit in proportion to the amount of liquid present in the tank. The electric current in the circuit operates a liquid level indicator gauge.

8 Claims, 7 Drawing Figures

Patented July 25, 1972

INVENTORS:
Emanuel J. DiNoia
Theodore R. Breunich
BY: James R. Hoatson, Jr.
Philip T. Liggett
ATTORNEYS

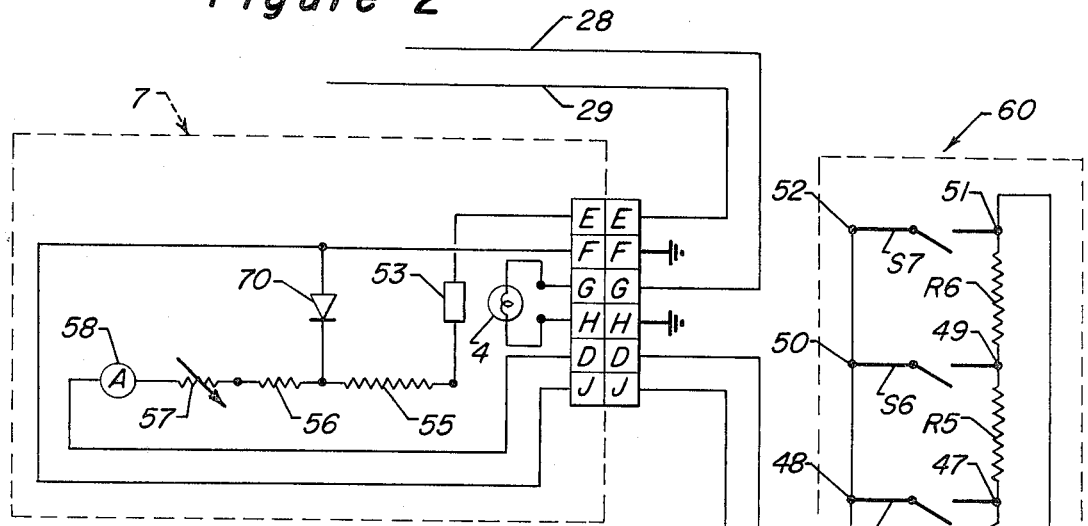
Figure 2
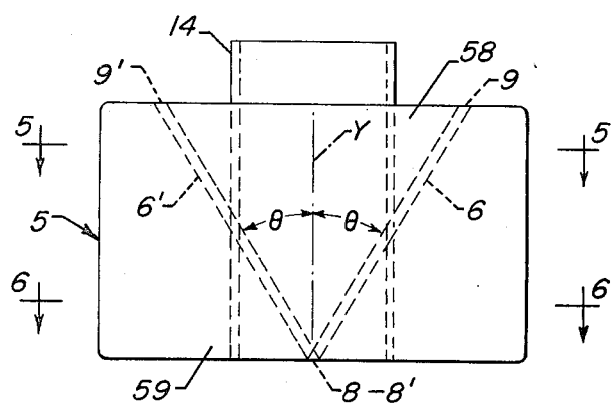
Figure 3
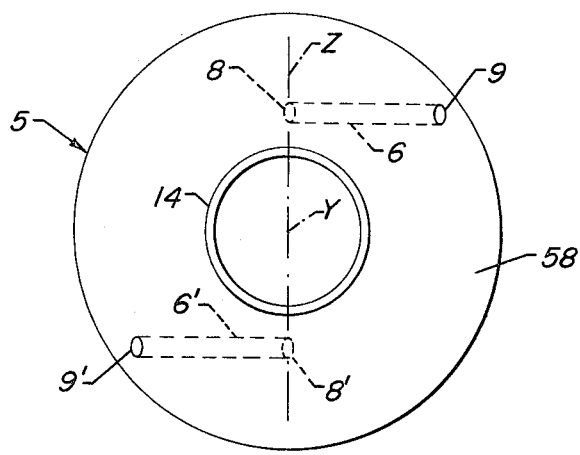
Figure 4
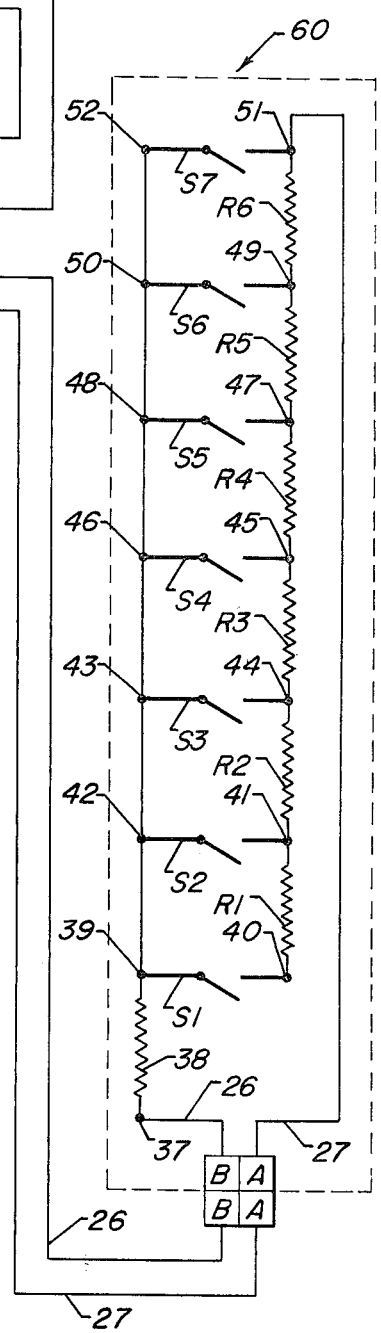
INVENTORS:
Emanuel J. DiNoia
Theodore R. Breunich
BY: James R. Hoatson, Jr.
Philip T. Liggett
ATTORNEYS

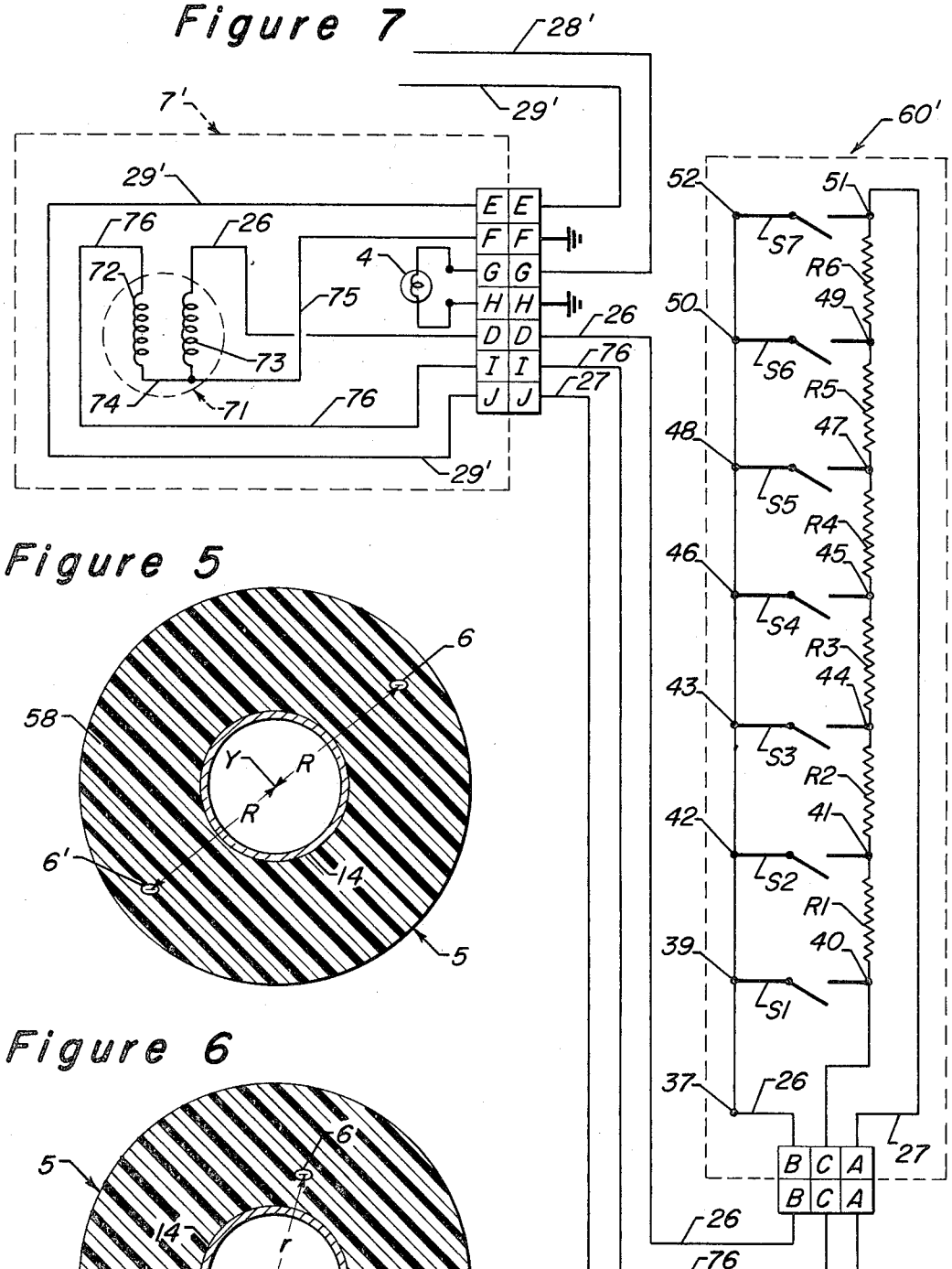
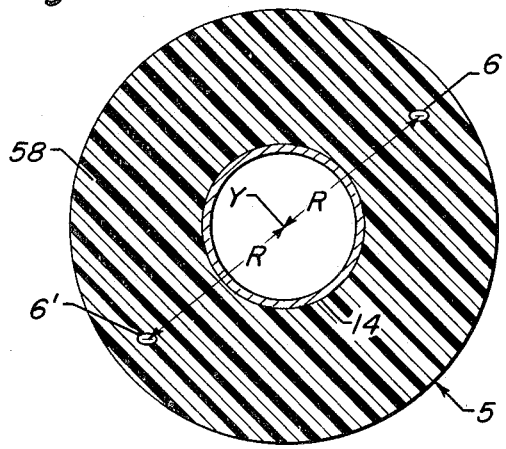
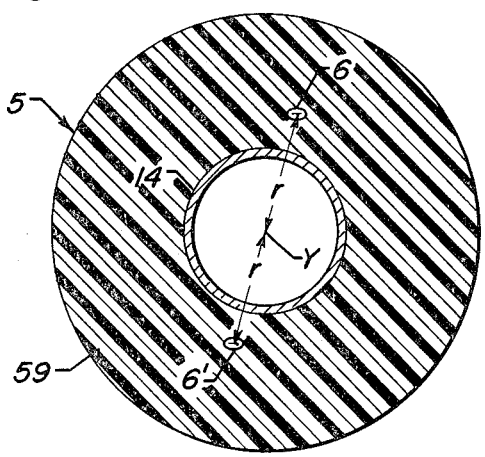

LIQUID LEVEL INDICATOR SYSTEM

This invention relates to a liquid level indicator system in which a liquid in a tank raises or lowers a float according to the level of liquid present. The float contains a magnetic element and is co-axially positioned about a vertical tube containing a reed switch circuit. The magnetic element of the float closes reed switches at or near the level at which the float is located, thereby short circuiting resistances in an electric circuit in proportion to the amount of liquid present in the tank. The current in the electric circuit operates a liquid level indicator gauge.

In existing liquid level indicator systems utilizing reed switches, a single reed switch is used within a hollow vertical tube and single or multiple ring magnets are used as magnetic elements. Because of the relatively short length over which a ring magnetic can influence the electrical condition of a reed switch, the existing liquid level indicator systems are useful only for measuring liquid level in relatively shallow tanks and for the purpose of indicating when a liquid level passes a predetermined point, such as an empty or dangerously low liquid level in a liquid storage tank.

Furthermore, since the present level indicating systems having a reed switch utilize magnetic rings or other magnetic elements that set up a uniform magnetic field, the reed switch undergoes numerous changes in electrical condition as the tank in which it is utilized is emptied or filled. In these present indicator systems, as the float moves vertically to traverse the length of the reed switch, the reed switch undergoes five different changes in electrical condition. When the float containing the magnetic element is distant from the reed switch, the switch is an open condition. As the magnetic element approaches the end of the reed switch, the switch is closed. The switch opens again when the magnetic element is moved slightly closer toward the center of the reed switch, but closes again when the magnetic element is opposite the center of the reed switch. As the magnetic element moves away from the center of the switch, the reed switch opens until the element is approximately opposite the other end of the reed switch, at which point the switch is closed. As the magnetic element moves further away from the reed switch, the reed switch once again is opened. This repeated change of condition of the reed switch necessitates an elaborate electrical circuit to make the switch condition meaningful.

To obviate this problem, plural magnetic rings are sometimes positioned on the float so that the magnetic rings may interact and the resultant magnetic field will be such as to eliminate the number of switch points or control points at which the reed switch is actuated during the longitudinal movement of the float with respect to the reed switch. Such a float construction reduces the accuracy of the instrument, however, because of the relatively long longitudinal actuating magnetic field set up by the combination of magnetic rings.

It is an object of the present invention to increase the accuracy of a liquid level indicator system operated by a change in electrical condition of a reed switch that is activated by a float containing a magnetic element. This accuracy is achieved by reducing the longitudinal or axial length along the vertical tube within which the magnetic field is strong enough to actuate a reed switch. Due to one unique aspect of this invention, this reduction in influence of the magnetic field is achieved without introducing multiple switch or contact points into the system. Such multiple contact points would cause the reed switch to repeatedly reverse electrical condition, as occurs in conventional systems utilizing a single ring magnet co-axially surrounding a vertical tube and moving longitudinally with respect to a reed switch. The present invention solves the problems of inaccuracy and instability through the unique construction and positioning of a magnetic element to achieve an unsymmetrical magnetic field. The magnetic element of this invention is partially in the upper portion and partially in the lower portion of the float. The moment of inertia about the axis of the inner vertical tube of the part of the magnetic element in one of the portions of the float is larger than the moment of inertia of the part of the magnetic element in the other portion of the float. The part of the magnetic element having the greater moment of inertia may be positioned in either the upper or lower portion of the float, as may the part of the magnetic element having the smaller moment of inertia. The inner vertical tube contains at least one longitudinally positioned reed switch. The float is co-axially positioned about and vertically movable with respect to the inner vertical tube in response to the liquid level within a tank. As a result of this construction, the magnetic element exerts a stronger magnetic field at the axis of the inner tube at that portion of the float wherein the moment of inertia of the part of the magnetic element is small when compared with the magnetic field at the axis at that portion of the float where the moment of inertia is large. That is, constructed and positioned in accordance with this invention, the magnetic element will produce a magnetic field stronger toward one end of the inner vertical tube than toward the other end of the inner vertical tube at the axis of the inner tube. This feature of the invention both increases the accuracy of the level indicator system by reducing the axial influence of the magnetic field, and eliminates the occurrence of multiple closure points in the operation of the reed switch.

Another object of the invention is the utilization of a liquid level indicator system containing a reed switch circuit actuated by a rising or falling float for use in measuring incremental changes in the liquid level over a substantial depth. Previously, the depth over which measurements could be taken was limited to just more than the length of a reed switch, with the increments of measurement being the distance between the five closure points previously described. Utilizing another aspect of the present invention, the length over which incremental measurement is possible is increased by the longitudinal alignment of a plurality of reed switches connected in parallel with each other within a vertical tube. A plurality of electrical resistors are connected in series with each other to form a resistor string which is one of the common terminals by means of which the reed switches are connected in parallel. That is, each of the resistors is connected between two adjacent reed switches to form this common terminal. Each of the reed switches is consecutively actuated and deactuated by a falling float level or by a rising float level in a tank containing a liquid. Actuation of each of the reed switches short circuits a specific resistor or resistors, thereby decreasing the overall load in the reed switch circuit and increasing the electrical current flowing in that circuit. The converse is true where the float moves in the reverse direction. The vertical spacing of the adjacent reed switches determines the accuracy of the level indicator system. The use of a plurality of longitudinally aligned reed switches also eliminates the necessity for multiple contact points presently required to obtain any incremental level indications in a level indicator system utilizing a single reed switch.

Yet another object of the invention is to eliminate resonant vibration of the transmitter or sensing unit of the liquid level indicator system. Resonant vibration is of particular concern because of the longer length of the sensing unit made possible by longitudinal positioning of the reed switches. Resonant vibration frequently occurs in fast moving airborne or land vehicles. The source vibration is set up from the internal mechanical parts of the vehicle or by air or wind resistance acting on the vehicle, or by a combination of both. Resonant vibration in the basic transmitter or sensing portion of the liquid level indicator sYstem is eliminated by fastening an outer guide tube in a particular manner to the basic inner tube containIng a reed switch circuit and about which a float containing a magnetic element is co-axially positioned. When the inner tube stands vertically by itself, there is a strong tendency for an external vibration to cause the free end of the relatively long columnar tube to whip back and forth within the liquid or surrounding atmosphere and eventually break off when the fatigue limit of the inner tube structure is reached. This repeated flexing of the sensing element of the level indicator system can be almost entirely eliminated by prohibiting the sensing element from achieving resonant vibration. This is accomplished by positioning the outer guide tube co-axially about the inner tube and firmly attaching the inner and outer tubes together at their mutually adjacent free ends. The opposite end, or fixed end of the inner tube is rigidly fastened to a support and the outer tube is held in compression against the support by the inner tube, thereby causing the inner tube to remain in tension. The free end of the sensing element of this structure, when subjected to vibration which at first tends to be resonant, starts to oscillate in resonant vibration. However, the first movement of the free end of the structure in a cycle of oscillation will cause one portion of the outer guide tube to lift away from the support against which it is compressed in the static condition. This shift in position of the outer guide tube from the support changes the magnitude and direction of forces acting on the free end of the inner tube and thereby dampens the oscillatory movement at the free end of the sensing element. The free end of the sensing element can never fall into a pattern of resonant vibration because the variable forces acting on the free end cause the resonant frequency of the sensing element to continually change each time the free end of the sensing element begins to oscillate.

Still another object of this invention is to increase the accuracy of the reed switch circuit by eliminating the presence of stray metallic particles from the vicinity of any reed switch. In conventional liquid level indicator systems utilizing a reed switch, metallic particles left from welds, unfinished edges of a metal tank, and metallic impurities in the liquid in the tank, tend to alter the normal pattern of actuation of the reed switch and thereby distort the liquid level reading. Such deviations occur because the stray metallic particles are drawn to the magnetic element of the float, become magnetized, and extend the influence of the magnetic field of the magnetic element. To eliminate the distortions in reed switch operation in this invention, an outer guide tube is positioned radially exteriorly from the float and co-axial with respect to the inner vertical tube containing the reed switch circuit. Upper and lower flow ducts connect the enclosure formed between the inner and outer tubes to the exterior of the outer tube. The lower flow ducts are located or extend below the lower extremity of the float when it is in its lowest float position, while upper flow ducts are located or extend above the upper extremity of the float in the upper float position. A scavenger magnet is positioned between the float and the lower extremities of the lower flow ducts. Magnetized particles carried by liquid through the lower flow ducts into the enclosure formed between the inner and outer tubes are disentrained and trapped by the scavenger magnet as the liquid passes through the lower flow ducts. As a result, the presence of stray metallic particles in the vicinity of the reed switch circuit is eliminated, since there is practically never any flow of liquid through the upper ducts into the enclosure formed between the inner and outer tubes.

One further object of this invention is to produce a liquid level indicator system easily adaptable for use with oddly shaped tanks or tanks having a variable cross-section. The same indicator or display system may be used with any liquid storage tank, regardless of the shape, through a proper choice of the resistors positioned between adjacent reed switches in the longitudinally aligned plurality of reed switches. That is, at the vertical level of the sensing element at which the liquid storage tank has a large horizontal cross-sectional area, the adjacent reed switches will have positioned therebetween resistors having a large electrical resistance. This is done so that there will be a large current change in the reed switch circuit by actuation or deactuation of one of the switches at this level. This large current change corresponds to the relatively large volume differential due to the large cross-sectional area of the storage tank at this level. Conversely, at vertical locations along the sensing element where the liquid storage tank has a relatively small horizontal cross-sectional area, adjacent reed switches will have a resistor or resistors of small electrical resistance connected therebetween. The presence of these smaller resistors in the reed switch circuit as governed by actuation or deactuation of one of the reed switches will reflect only a small current differential corresponding to the small volume change in the tank due to the relatively small cross-sectional area of the tank at that level.

The liquid level indicator system of this invention has a variety of uses and may be utilized to measure the liquid level in fuel tanks, crank cases, railroad cars, ballast tanks, vats, water reservoirs, and virtually any other liquid storage tank. In addition, the liquid level indicator system of this invention may also be used to determine the liquid level in compartments subject to flooding, such as compartments in a ship, basements of low lying buildings, and mines.

In one broad aspect, this invention is, in a liquid level indicator system having a hermetically sealed inner vertical tube of uniform cross-section constructed of a non-magnetic material; a float carrying a magnetic element positioned co-axially about said inner tube and vertically movable with respect to said inner tube between an upper and a lower float position; and an indicator system having an electric current indicator means and electric power leads, the improvement comprising: a plurality of reed switches connected in parallel and connected to said electric power leads and longitudinally aligned within said inner tube; and a plurality of electrical resistors connected in series with each other and connected to said electric power leads with each of said resistors connected between two adjacent reed switches.

In another sense, the invention may be considered as, in a liquid level indicator system having a hermetically sealed inner vertical tube containing a reed switch circuit and mounted in a tank containing a liquid, a liquid level display device electrically connected to said reed switch circuit, a float carrying a magnetic element positioned co-axially about said inner tube and vertically movable with respect to said inner tube between an upper and a lower float position, an outer guide tube co-axially positioned with respect to said inner vertical tube, thereby forming an enclosure between said inner and outer tubes, upper flow ducts and lower flow ducts located below said lower float position connecting said enclosure to the exterior of said outer tube, the improvement comprising a scavenger magnet positioned vertically between said lower float position and said lower flow ducts and laterally between said inner tube and said outer tube, whereby magnetizable particles in said liquid are disentrained and trapped by said scavenger magnet as liquid passes through said lower flow ducts.

Still another broad aspect of the invention is, in a liquid level indicating system having a hermetically sealed inner vertical tube containing a reed switch circuit rigidly mounted on a support in a tank containing a liquid, a liquid level display device electrically connected to said reed switch circuit, a float carrying a magnetic element positioned co-axially about said inner tube and vertically movable with respect to said inner tube, an outer guide tube co-axially positioned with respect to said inner vertical tube, thereby forming an enclosure between said inner and outer tubes, and upper and lower flow ducts connecting said enclosure to the exterior of said outer tube, the improvement comprising a firm attachment of said outer tube and said inner tube at mutually adjacent ends remote from said support, and said outer tube is held in compression against said support by said inner tube, thereby causing said inner tube to remain in tension.

In a final aspect, the invention may also be considered as, in a liquid level indicating system having a hermetically sealed inner vertical tube containing a reed switch circuit and having first and second ends and mounted in a tank containing a liquid, a liquid level display device electrically connected to said reed switch circuit, a float having upper and lower portions carrying a magnetic element and positioned co-axially about said inner tube and vertically movable with respect to said inner tube between an upper and a lower float position, the improvement comprising positioning said magnetic element partially in said upper portion and partially in said lower portion of said float, and said magnetic element is constructed having the moment of inertia about the axis of said inner tube of the part of said magnetic element in one of said portions of said float larger than the moment of inertia of the part of said magnetic element in the other of said portions of said float, whereby the magnetic field of said magnetic element is stronger toward one of said first and second ends than toward the other of said first and second ends of said inner vertical tube.

This invention is more clearly illustrated by reference to the accompanying drawings.

FIG. 2 is a schematic diagram of the electrical circuitry of the embodiment of FIG. 1.

FIG. 3 is an isolated elevational view of the float of the embodiment of FIG. 1.

FIG. 4 is a plan view of FIG. 3.

FIG. 5 is a sectional view taken along the lines 5—5 of FIG. 3.

FIG. 6 is a sectional view taken along the lines 6—6 of FIG. 3.

FIG. 7 is a schematic diagram of the electrical circuitry of a modified form of the embodiment of FIG. 1.

Figure 1:
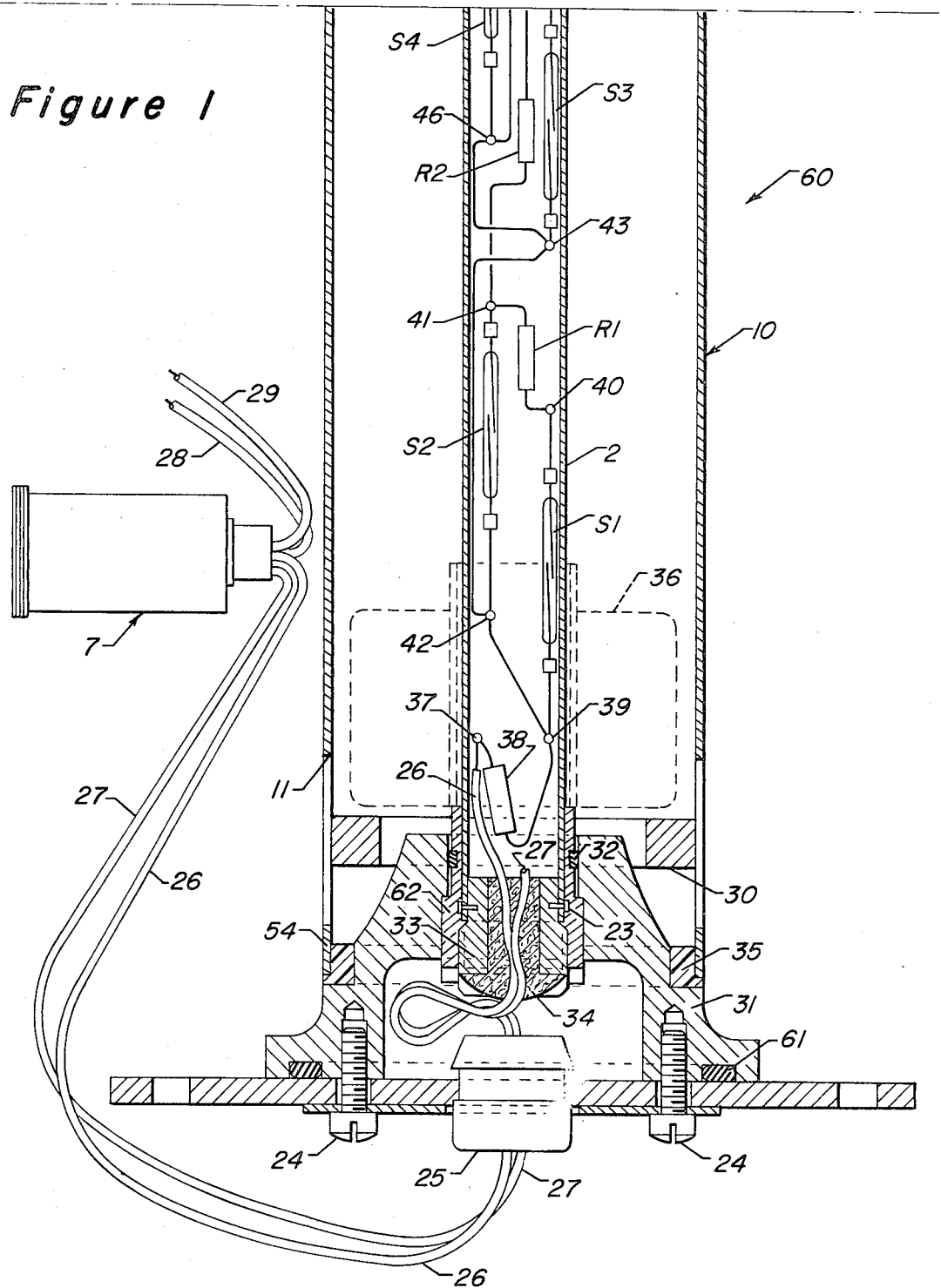
FIG. 1 is an elevational view in partial section of a preferred embodiment of this invention.
Figure 1:
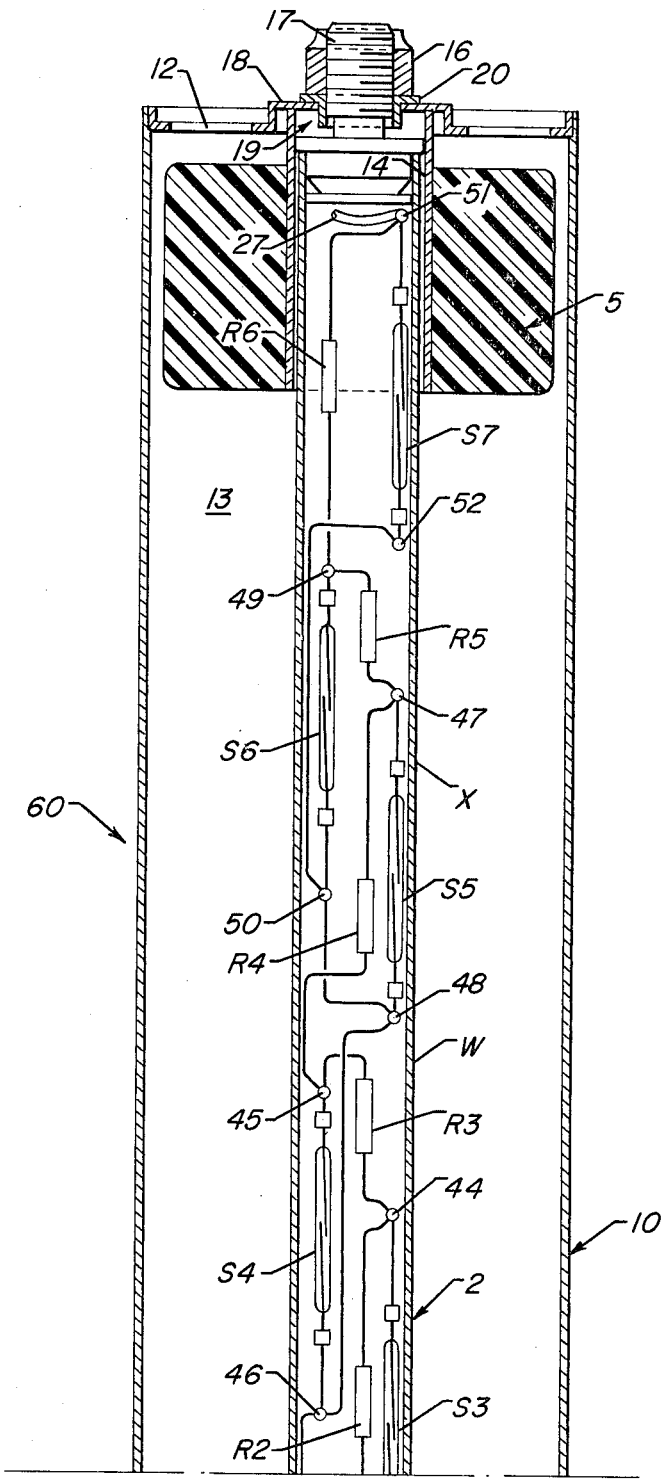

Referring now to FIG. 1, there is shown a liquid level indicator system comprised of a sensing element or transmitter 60 and a receiving element, display device, or indicator system 7. The major component parts of the transmitter 60 are the inner vertical tube 2, the reed switches S1 through S7, the electrical resistors R1 through R6, the float 5, and the outer guide tube 10.

Inner vertical tube 2 is mounted on a solid support 1, which may be considered to be the bottom of a liquid storage tank. Machine screws 24 pass through the tank bottom or support 1 and firmly attach mounting block 31 to support 1. The mounting block 31 is sealed to support 1 by means of an 0-ring 61. A plug 33 is force fitted into inner tube 2 with an exteriorly threaded portion of plug 33 protruding from inner tube 2. Counter sunken screws 23 further attach plug 33 to inner tube 2. The center of plug 33 is filled with a core 34 made of a sealing substance, such as tar, to surround wires 26 and 27 and insure a fluid tight seal at the lower end of inner tube 2. The threaded end of plug 33 is threadably engaged to interiorially threaded end fitting 62. End fitting 62 is force fitted into an aperture in steel mounting block 31 and is further sealed to mounting block 31 by means of an 0-ring 32. A leakproof seal is thereby formed between the exterior of the inner tube 2 and the exterior of the floor 1 of the liquid storage tank.

Outer guide tube 10 is positioned radially exteriorly from float 5 and co-axial with respect to inner vertical tube 2, thereby forming an enclosure 13 between inner tube 2 and outer tube 10. Upper flow ducts 12 and lower flow ducts 11 connect the enclosure 13 to the exterior of the outer tube 10. The lower extremities of the lower flow ducts 11 extend below the lower extremity of float 5 when it is in the lowest float position, designated by the numeral 36. Outer tube 10 is constructed with an end cap 18 perforated by upper flow ducts 12. The upper end of inner vertical tube 2 is sealed by an end plug 19 having an axial upward extending threaded stud 17. The end cap 18 is positioned on a shoulder of end plug 19. A collar 20 is slipped over stud 17 to securely position end cap 18 against end plug 19. Thereafter, a self-locking nut 16 is threadably engaged with stud 17 and firmly attaches and co-axially fixes the unsecured or free end of inner vertical tube 2 to the mutually adjacent end of outer guide tube 10. Since the opposite end of inner tube 2 is rigidly fastened to support 1 through mounting block 31 and end fitting 62, and since outer guide tube 10 is of a sufficient axial length, the outer guide tube 10 is held in compression against support 1, thereby causing inner guide tube 2 to remain in tension between the free end of outer guide tube 10 and support 1. The outer guide tube 10 is held in compression against support 1 because the lower edge 54 of outer guide tube 10 is pressed dOwnward into a nylon damping ring 35, which, though having vibration damping characteristics, is rigid enough to support outer guide tube 10 in compression.

The plurality of reed switches S1 through S6 are connected in parallel by common terminals and are longitudinally aligned at predetermined intervals within inner tube 2. The alignment is not necessarily axial, but is generally longitudinal with respect to the axis of the inner tube 2. The plurality of electrical resistors R1 through R6 are connected in series with each other to form a string of resistors having a first end 51 and a second end 40. The string of resistors forms one of the common terminals of the reed switches with each of the resistors R1 through R6 connected between two adjacent reed switches. The string or series of resistors terminates in a connection wire 27 at junction or first end 51, and at a junction or second end 40. A portion of connection wire 27 is depicted as being broken off throughout the length of the inner tube 2 in FIG. 1 for the sake of clarity. The actual electrical connections are more clearly shown in the schematic diagram of FIG. 2. As can be seen by reference to FIG. 2, each reed switch is connected in parallel between two common terminals, one of which leads to connection wire 26 and the other of which is formed by the resistors R1 through R6 and leads to connection wire 27. Each of the resistors R1 through R6 is connected between two adjacent reed switches. Resistor R1 is connected between switches S1 and S2 at junctions 40 and 41, resistor R2 is connected between switches S2 and S3 at junctions 41 and 44, resistor R3 is connected between switches S3 and S4 at junctions 44 and 45, and so forth.

Float 5 is a buoyant annular body containing a magnetic element, which in its preferred form is comprised of two inclined bar magnets 6 and 6' of equal length. Bar magnet 6 has a first end 8 and a second end 9 while bar magnet 6' has a first end 8' and a second end 9'. The first ends 8 and 8' of the bar magnets lie in the lower portion 59 of float 5 while the second ends 9 and 9' of the bar magnets lie in the upper portion 58 of float 5. The bar magnets 6 and 6' each lie in separate planes parallel to each other and to the axis Y of the inner tube 2, as can be seen by reference to FIG. 4. The first ends 8 and 8', of bar magnets 6 and 6' respectively, lie at the intersections with the respective separate parallel planes containing magnets 6 and 6', of an imaginary line Z passing through the common axis Y of the float 5 and the inner tube 2 perpendicular to the respective parallel planes. Each of the bar magnets 6 and 6' diverges from its first end toward its second end at the same angle $\theta$, and the bar magnets lie in opposite directions from a projection of the axis Y onto the separate parallel planes containing the bar magnets 6 and 6'. From FIGS. 3 and 4, it can be seen that the bar magnets 6 and 6' are in a skew relationship with each other. It can also be seen that the first ends 8 and 8' of the bar magnets are the lower ends and that the second ends 9 and 9' are the upper ends and that the angle $\theta$ is about 35°. The float 5 could be inverted so that the first ends 8 and 8' would be the upper ends of the bar magnets and the second ends 9 and 9' would be the lower ends. The liquid level 9 indicator system performs equally well using either configuration.

The result of the configuration of the bar magnets 6 and 6' as illustrated in the drawings is that the magnetic element of the float sets up an unsymmetrical magnetic field. That is, the magnetic field of the magnetic element is stronger toward one end of the inner vertical tube 2 than toward the other end of the inner vertical tube 2. With the float 5 in the position indicated, the magnetic field is stronger toward the lower end of the tube 2 than toward the upper end as measured at the axis Y. As a result of the unsymmetrical magnetic field, each of the reed switches has but two contact points or planes. That is, each switch will remain open until the center of float 5 approaches to within a given axial distance. At that point, the switch will close and remain closed until the float moves past the switch a different predetermined distance. For example, the switch S5 of FIG. 1 has an upper contact point X and a lower contact point W. It should be noted that because of the unsymmetrical magnetic field of float 5, and because the magnetic field of the bar magnets 6 and 6' is stronger toward the lower end of inner tube 2 than toward the upper end of inner tube 2, the lower contact point W is more distant from the center of reed switch S5 than is the upper contact point X. One feature of the magnetic element of the float 5 is that it is positioned partially in the upper portion 58 of the float 5 and partially in the lower portion 59 of float 5, and upper portion 58 and lower portion 59 may be considered to be of approximately equal thickness. The moment of inertia of the part of the magnetic element in the upper portion 58 of the float about the axis Y of the inner tube 2 is larger than the moment of inertia of the part of the magnetic element in the lower portion 59 of the float 5. The part of the magnetic element in the lower portion 59 of the float 5 is comprised of those portions of bar magnets 6 and 6' terminating in lower ends 8 and 8'. It is the essential feature of a difference in moments of inertia that causes the magnetic field to be unsymmetrical and stronger toward one end of the inner tube 2 than toward the other end. This feature is most clearly illustrated in FIGS. 5 and 6. FIG. 5 is a sectional view of the float 5 taken through the upper portion 58 of float 5. It can be seen that the area of the magnetic element is comprised of the oval cross-sections of bar magnets 6 and 6', each cross-section being a distance R from the axis Y of the tube 2. The moment of inertia of the magnetic element about the axis Y may thereby be represented by the equation: $I_5 = (area_6 + area_{6'}) \cdot R^2$, where $I_5$ is the moment of inertia of the magnetic element in the plane of FIG. 5 and $area_6$ and $area_{6'}$ are the horizontal cross-sectional areas of the bar magnets 6 and 6' respectively. By comparison, the moment of inertia of the magnetic element about the axis Y computed in the plane of FIG. 6 through the lower portion 59 of float 5 may be represented by the equation: $I_6 = (area_6 + area_{6'}) \cdot r^2$, where $I_6$ is the moment of inertia of the magnetic element in the plane of FIG. 6 and where the cross-sectional area of the bar magnets 6 and 6' are each located a distance $r$ from the axis Y in FIG. 6. Since the distance R is greater than the distance $r$, $I_5$ is greater than $I_6$. It can be seen that by integrating the moment of inertia with respect to the thickness of float 5, the moment of inertia of the magnetic element about the axis Y in the upper portion 58 of the float 5 is larger than the moment of inertia of the magnetic element about the axis Y in the lower portion 59 of the float 5 because the bar magnets 6 and 6' are always more distant from the axis Y in the upper portion 58 than in the lower portion 59. The magnetic field at the axis Y of tube 2 is necessarily greater at the lower extremity of the float 5 than at the upper extremity of the float 5.

A scavenger magnet 30 is fastened to the interior wall of outer guide tube 10. Scavenger magnet 30 is a ring magnet that extends around the inner diameter of outer guide tube 10 and is positioned vertically between the lower float position 36 and the lower extremities of the lower flow ducts 11. Scavenger magnet 30 is positioned laterally between the inner tube 2 and the outer tube 10. As a result of the magnetic characteristics and positioning of scavenger magnet 30, magnetizable particles carried in the liquid within which transmitter 60 is positioned are disentrained from the liquid and trapped by scavenger magnet 30 as liquid passes from the exterior of outer guide tube 10 through lower flow ducts 11 and into the enclosure 13 between the inner tube 2 and the outer guide tube 10. Stray metallic particles are thereby removed from the tank and do not interfere with or distort the operation of the reed switches.

Float 5 is constructed of an annular ring of buoyant plastic to the interior surface of which an inner annular nylon guide 14 is fastened to insure smooth dependable vertical movement of the float 5 with respect to inner tube 2 between the upper position, in which it is depicted in FIG. 1, and the lower float position designated as 36. The float 5 floats at the liquid level present in the liquid storage tank in which the transmitter 60 is located. The bar magnets 6 and 6' provide a magnetic field that operates the reed switches when the float passes the switch contact points. This results in a progressive switch closure as the float moves axially along the inner tube 2. As the float 5 rises from the lower float position 36, progressive switch closure occurs and the resistors R1 through R6 are sequentially shorted out of the reed switch circuit. As shown in the electrical schematic of FIG. 2, the short circuiting of resistors R1 through R6 reduces the overall resistance in the reed switch circuit between contact pins A and B. In effect, the resistance measured between pins A and B is an inverse analog of the float position and, in turn, of the liquid level. A resistor 38 having a substantial resistance, though not an essential element of the invention, always remains in the reed switch circuit as a protective resistor. When the float 5 is in the lower float position 36, reed switch S1 is closed and the circuit path is closed through connecting wire 26, protective resistor 38, junction 39, switch S1, junction 40, and through every resistor R1 through R6 and back through connecting wire 27 to contact pin A. As the float 5 rises from the lowest float position 36, the switch S2 is subjected to the magnetic field of bar magnets 6 and 6'. This causes switch S2 to close thereby short circuiting resistor R1. The electrical path between contact pins B and A is through connecting wire 26, protective resistor 38, junction 42, switch S2, junction 41, and resistors R2 through R6 and back to pin A through connecting wire 27. Because of the configuration of bar magnets 6 and 6' the magnetic field at the axis of inner tube 2 is stronger in a downward direction from float 5 than in an upward direction from float 5. The switch S1 thereby remains closed until float 5 rises about even with switch S2, at which time switch S1 is beyond the influence of the magnetic field and therefore returns to an open condition. As float 5 rises still further, switch S3 is closed thereby short circuiting both of the resistors R1 and R2. The electrical path between contact pins B and A is then through connecting wire 26, protective resistor 38, junction 43, switch S3, junction 44, and resistors R3 through R6, then through connecting wire 27 back to pin A. The sequential short circuiting of resistors continues as float 5 rises until all of the resistors R1 through R6 are short circuited when the float 5 is in the upper float position. At this point, the electrical circuit between contact pins B and A is through connecting wire 26, protective resistor 38, junction 52, switch S7, junction 51, and back through connecting wire 27 to pin A. From the operation of the transmitter 60, it can be seen that each of the resistors R1 through R6 has a control switch associated therewith. That is, one of the two reed switches adjacent to each resistor controls the presence in the circuit of that resistor. Switch S2 is the control switch for resistor R1, switch S3 is the control switch for R2, and so forth.

In the progressive short circuiting of resistors R1 through R6, each additional resistor short circuited produces a corresponding decrease in the total resistance in the reed switch circuit between pins B and A and a corresponding increase in current through the circuit. If the liquid storage tank is oddly shaped, the resistors R1 through R6 will be chosen so that the resistance value of the resistors located between adjacent reed switches varies in proportion to the horizontal cross-sectional area of the tank at the vertical level of the control switch associated with each of the resistors. For example, if the tank has a small cross-sectional area at the top of the tank, a large cross-sectional area at the center of the tank, and a small cross-sectional area at the bottom of the tank, the electrical resistances of the various resistors will differ accordingly. That is, the resistors R5 and R6 and the resistors R1 and R2 will be relatively small as compared with resistors R3 and R4. This will reflect a smaller change in current as the float 5 moves in the upper or lower portion of the tank as compared with the movement of the float in the central portion of the tank. This will accurately reflect the relative change in volume, since a movement of the float a given distance in the upper or lower portion of the tank will result from a proportionately smaller change in volume than an equal linear movement of the float in the central portion of the tank.

In FIG. 2 it can be seen that the indicator system 7 is connected to the common terminals of the reed switch circuit through connecting wires 26 and 27 and provides a constant input voltage to the reed switches S1 through S7 and the resistors R1 through R6 display the output voltage from the switches and resistors as determined by the axial location of the float 5 with respect to the inner vertical tube 2. The electrical configuration of the indicator system 7 is shown in FIG. 2. The electrical current for the operation of the liquid level indicator system is supplied to indicator system from electric lead 29. The power for the operation of the liquid level indicator system is supplied on lead 29 through pins E to a constant current regulator 53. Constant current regulator 53 is comprised of a resistor temperature compensated reference diode circuit and is designed to protect the rest of the circuitry of the liquid level indicator system from large voltage surges. The output of constant current regulator 53 is connected through fixed resistors 55 and 56 and adjustable resistor 57 to a current indicator means which is illustrated as a milliameter 58. A blocking diode 70 is connected to ground between the resistors 55 and 56. Blocking diode 70 will not pass a current up to a predetermined voltage, such as 5 volts. Current produced from all voltage over this predetermined voltage is passed through blocking diode 70 to ground. As a result, as long as the input voltage on lead 29 is kept above this predetermined voltage, the predetermined voltage will be applied to resistor 56 and all subsequent impedances in the circuit. Any fluctuations in voltage will merely be conducted to ground through blocking diode 70. The voltage passing through milliameter 58 and through the reed switch circuit is therefore highly stable. Milliameter 58 is the visual display device and is calibrated in terms of depth or volume of liquid within the storage tank. The current from the predetermined voltage flows through resistor 56, resistor 57, milliameter 58, and contact pins D to connecting wire 26 and then to the contact pins B of the transmitter 60. Within transmitter 60 the current flows through resistor 38 and none, some, or all of the resistors R1 through R6 as previously described and back to contact pins A. From contact pins A the current flows from the transmitter 60 back to the pins J of indicator system 7. From pins J the current is conducted to ground through pins F. As the resistance within the transmitter 60 varies with the liquid level, the current flowing through the milliameter 58 varies proportionately. Electric lead 28 of the indicator system 7 is used to supply a small voltage for an interior lamp 4 within the indicator system 7. The current for the operation of the lamp is connected to the indicator system 7 through pins G, and the lamp 4 is grounded through pins H.

The two portions of the electrical contacts comprised of the pins E, F, G, H, D, and J are each comprised of a plug-in type electrical interface for easy attachment to and detachment from the indicator system 7. Similarly, the pins A and B are of the plug-in type variety, and contact with the transmitter 60 may easily be made or broken. Indicator system 7 may easily be used with any other transmitter having different resistance values by recalibrating the indicator system 7 by merely varying the adjustable resistor 57.

The schematic wiring diagram for a modified form of the liquid level indicator system is illustrated in FIG. 7. At transmitter 60', a pin C is inserted between pins A and B. At indicator system 7', a pin I is inserted between pins D and J. These additional pins enable an additional electrical connection, to be made between the transmitter 60' and the indicator system 7'. A ratio meter 71 is substituted in the indicator 7' in place of the resistors 55, 56, and 57, the blocking diode 70, the constant current regulator 53 and the milliameter 58 in FIG. 2. Resistor 38 is removed from the transmitter 60 to facilitate ratio readings. Ratio meter 71 has a first coil 72 and a second coil 73, each coil having a common terminal 74 and separate terminals as illustrated. Lead 29' may be considered to be a first electric power lead while lead 75 may be considered to be a second electric power lead. The power for the operation of the liquid level indicator system is supplied on lead 29' through pins E and J. Lead 29' is connected to the first end 51 of the resistor string in transmitter 60' through wire 27 and pins J and A. The separate terminal of the second coil 73 of ratio meter 71 is connected to the reed switches by wire 26 through pins D and B. The second electric power lead 75 is connected to the common terminal 74 of coils 72 and 73 and to ground at pins F. The separate terminal of the first coil 72 is connected to the second end or junction 40 of the resistor string in transmitter 60' by wire 76 which passes through pins I and C.

The wiring arrangement of FIG. 7 has some advantage over that of FIG. 2 in that the ratio meter 71 uses two coils instead of the single coil employed in milliameter 58. All of the resistances R1 through R6 are connected in series with the first coil 72 while the coil 73 is connected in series with some, none, or all of the resistors R1 through R6. That is, as the float 5 ascends along the inner tube 2, the coil 73 is connected in series with more and more of the resistances R1 through R6. The converse is true as the float descends. The ratio meter 71 senses the ratio of the resistances connected to coil 73 to the full resistance load connected to coil 72. This ratio is reflected in the calibrated reading of the ratio meter 71. It can be seen that as the switches S1 through S7 progressively close, the ratio changes accordingly. The advantage of this type of circuitry is that no voltage stabilization is required on the first power lead 29', because any voltage change affects both of the coils 72 and 73 but does not affect the ratio.

Once again referring to FIG. 1, it can be seen that the transmitter 60 has a long length in comparison to its diameter. One serious problem with conventional liquid level indicator systems utilizing long tubes is the problem of resonant vibration. A rigid tube will frequently achieve resonant vibration and fail rapidly when subjected to external vibration, so that some type of damping is required. In the structure of transmitter 60 the outer tube 10 and the inner tube 2 are firmly attached to each other at their mutually adjacent upper ends remote from the support 1. The lower end of inner vertical tube 2 is rigidly mounted on support 1 through end fitting 62 and mounting block 31. The inner tube 2 will therefore tend to resonant when support 1 is subjected to external vibration. In order for tube 2 to vibrate, it is necessary for the outer tube 10 to also vibrate. As soon as the outer tube 10 starts to move, however, its lower edge 54 moves with respect to the damper ring 35. That is, the lower edge 54 of outer tube 10 lifts up from one side of damper ring 35 and further compresses on the other side of damper ring 35. The opposing variable forces which the damper ring 35 exerts on the outer guide tube 10 change the overall forces acting on the outer guide tube 10 and the inner tube 2 and prevent a resonant condition from developing in the transmitter 60. If resonance cannot occur or be maintained in the inner tube 2 or the outer tube 10, the vibration amplitudes imposed on the transmitter 60 do not create stress problems. The design feature of rigidly fastening the adjacent ends of the inner and outer tubes and fastening the inner tube to the support 1 so that the outer tube is in compression while the inner tube is in tension makes variable a resonance frequency that would otherwise be constant, and so prevents the free end of transmitter 60 from achieving lateral resonant oscillation.

While the transmitter 60, as illustrated in the drawings is shown as being mounted to the floor of a liquid storage tank, it performs equally as well when vertically mounted upon any support within the liquid storage area, and may be mounted from an overhead support so that the free end of the inner tube 2 extends downward. In such a case slight, inconsequential circuit modifications would have to be made in order for the current indicator means employed to reflect measurements identical to those obtained with the embodiment of FIG. 1 for corresponding liquid level conditions.

The foregoing detailed descriptions and illustrations of several embodiments of this invention have been given for clearness of understanding only, and no unnecessary limitations should be construed therefrom, as other modifications will be obvious to those familiar with liquid level indicator systems.

We claim as our invention:

1. A liquid level indicator system comprising:
   a. a hermetically sealed vertical tube of uniform cross section constructed of a non-magnetic material;
   b. a plurality of reed switches connected in parallel by common terminals and longitudinally aligned within said tube;
   c. a plurality of electrical resistors connected in series with each other to form one of the aforesaid common terminals with each of said resistors connected between two adjacent reed switches;
   d. a float carrying a magnetic element positioned co-axially about said tube and vertically movable with respect to said tube between an upper and a lower float position, said magnetic element comprising two inclined bar magnets of equal length each having first and second ends and each lying in separate planes parallel to each other and to the axis of said tube, said first ends of said bar magnets lying at the intersections of said separate planes with a line that passes through the axis of said tube perpendicular to said separate planes, each of said bar magnets diverging from its first end toward its second end at the same angle and in opposite directions from a projection of the axis of said inner tube onto said separate parallel planes, whereby said bar magnets are in a skew relationship with respect to each other; and,
   e. an indicator system connected to said common terminals for providing an input voltage to the aforesaid switches and resistors and for registering the current passing through said switches and resistors as determined by the longitudinal location of said float with respect to said vertical tube.

2. The liquid level indicator system of claim 1 further comprising a support, an outer guide tube positioned radially exteriorly from said float and co-axial with respect to said vertical tube thereby forming an enclosure between said vertical tube and outer guide tube, upper and lower flow ducts connecting said enclosure to the exterior of said outer tube, and said vertical tube and outer guide tube are firmly attached to each other at mutually adjacent ends, and the end opposite the mutually adjacent end of said vertical tube is rigidly fastened to said support and said outer tube is held in compression against said support by said vertical tube, thereby causing said inner tube to remain in tension.

3. The liquid level indicator system of claim 1 further characterized in that an outer guide tube is positioned radially exteriorally from said float and co-axial with respect to said vertical tube thereby forming an enclosure between said vertical tube and outer guide tube, upper flow ducts and lower flow ducts located below said lower float position connecting said enclosure to the exterior of said outer tube, and a scavenger magnet positioned between said float and said lower flow ducts, whereby magnetizable particles carried in liquid are disentrained and trapped by said scavenger magnet as liquid passes through said lower flow ducts.

4. The liquid level indicator system of claim 1 further characterized in that said magnetic element creates an unsymmetrical magnetic field.

5. The liquid level indicator system of claim 1 further characterized in that said first ends are lower ends and said second ends are upper ends of said bar magnets, and said angle is about 35°.

6. The liquid level indicator system of claim 1 further comprising a support, and wherein said tube is mounted on said support in a tank containing liquid, and said electrical resistors are each short circuited by operation of a control switch which is one of said adjacent reed switches between which said resistors are connected, and the resistance value of the resistors located between adjacent reed switches varies in proportion to the horizontal cross-sectional area of said tank at the vertical level of the control switch associated with said resistors.

7. In a liquid level indicating system having an hermetically sealed vertical tube containing a reed switch circuit and having first and second ends and mounted in a tank containing a liquid, a liquid level display device electrically connected to said reed switch circuit, a float having upper and lower portions carrying a magnetic element and positioned co-axially about said tube and vertically movable with respect to said tube between an upper and lower float position, said magnetic element being comprised of two inclined bar magnets of equal length each having first and second ends and each lying in separate planes parallel to each other and to the axis of said tube, said first ends of said bar magnets lying in one of said upper and lower portions of said float at the intersections with said separate planes of a line through the axis of said tube perpendicular to said separate parallel planes, and said second ends of said bar magnets lying in the other of said upper and lower portions of said float, each of said bar magnets diverging from its first end toward its second end at the same angle and in opposite directions from a projection of the axis of said tube onto each of said separate parallel planes, whereby said bar magnets are in a skew relationship with respect to each other, said magnetic element partially in said upper portion and partially in said lower portion of said float, and said magnetic element having the moment of inertia about the axis of said tube of the part of said magnetic element in one of said portions of said float larger than the moment of inertia of the part of said magnetic element in the other of said portions of said float, whereby the magnetic field of said magnetic element is stronger toward one of said first and second ends than toward the other of said first and second ends of said vertical tube.

8. The liquid level indicator system of claim 7 further characterized in that said first ends of said bar magnets lie in said lower portion of said float and said second ends of said bar magnets lie in said upper portion of said float, and said angle is about 35°.

* * * * *